United States Patent [19]

Kishida et al.

[11] 4,435,540
[45] Mar. 6, 1984

[54] NOVEL POLYMER COMPOSITION

[75] Inventors: Kazuo Kishida, Otake; Isao Sasaki, Hiroshima; Nobuhiro Mukai, Otake, all of Japan

[73] Assignee: Mitsubishi Rayon Co., Ltd., Tokyo, Japan

[21] Appl. No.: 336,460

[22] Filed: Dec. 31, 1981

[30] Foreign Application Priority Data

Jan. 6, 1981 [JP] Japan .................................. 56/937
Mar. 12, 1981 [JP] Japan .................................. 56/35549

[51] Int. Cl.$^3$ .......................... C08K 3/04; C08K 3/08; C08K 3/26; C08K 3/00
[52] U.S. Cl. ................................. 524/780; 524/779; 524/781; 524/783; 524/784; 524/785; 524/786; 524/787; 524/788; 524/789; 524/814; 524/817; 524/833; 524/854
[58] Field of Search .............. 524/833, 854, 781, 783, 524/784, 780, 786, 785, 788, 814, 817, 787, 779, 789

[56] References Cited

U.S. PATENT DOCUMENTS

| | | | |
|---|---|---|---|
| 3,884,871 | 5/1975 | Herman et al. | 524/817 |
| 3,935,340 | 1/1976 | Yamaguchi et al. | 427/216 |
| 3,946,139 | 3/1976 | Bleyle et al. | 524/817 |
| 4,015,991 | 4/1977 | Persinski et al. | 524/5 |
| 4,048,136 | 9/1977 | Kobayashi et al. | 524/506 |
| 4,060,511 | 11/1977 | Sinclair et al. | 524/904 |
| 4,070,334 | 1/1978 | Green | 524/833 |
| 4,102,856 | 7/1978 | Lee | 524/854 |
| 4,130,512 | 12/1978 | Streat | 524/784 |
| 4,147,681 | 4/1979 | Lim et al. | 542/817 |
| 4,194,920 | 3/1980 | Burke et al. | 524/843 |
| 4,230,810 | 10/1980 | Lattime | 524/817 |

OTHER PUBLICATIONS

Die Angewandte Makromolekulare Chemie, 53, (1976), 65–72; Dept. of Applied Chemistry, Faculty of Engineering Tohuku University, Sendai, Japan; Polymerization of Methyl Methacrylate in the Presence of Graphite.

Chemistry and Industry; Aug. 3, 1974; Polymerisation of Methyl Methacrylate in the Presence of Various Metal Oxides, Sands and Slags.

Primary Examiner—John C. Bleutge
Assistant Examiner—Herbert J. Lilling
Attorney, Agent, or Firm—Oblon, Fisher, Spivak, McClelland & Maier

[57] ABSTRACT

A polymer composition wherein an inorganic substance and an organic polymer are firmly consolidated, which is characterized by being produced by polymerizing a vinyl monomer susceptible to radical polymerization in a polymerization system containing a dispersed inorganic substance in the presence of at least one monomer selected from sulfonic acid monomers, sulfonate monomers, or carboxylic acid monomers represented by the general formula [I]

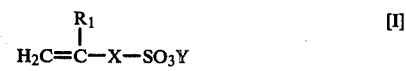

wherein $R_1$ is a hydrogen atom, alkyl group having 1 to 20 carbon atoms, phenyl group, derivative of phenyl group, or halogen atom, X is CONH,

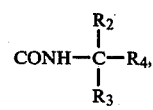

$COO(CH_2)_m$ or $(CH_2)_n$ (wherein $R_2$ and $R_3$ are each a hydrogen atom or alkyl group having 1 to 15 carbon atoms, $R_4$ is an alkylene group having 1 to 15 carbon atoms, m is an integer of 1 to 20, and n is an integer of 0 to 20), and Y is a hydrogen atom, ammonium radical, or an alkali metal atom, or by the general formula [II]

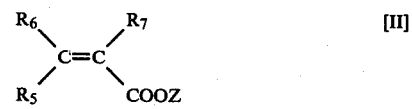

wherein $R_5$ is a hydrogen atom, alkyl group having 1 to 15 carbon atoms, COOZ, halogen atom, phenyl group, or derivative of phenyl group, $R_6$ is a hydrogen atom, alkyl group having 1 to 15 carbon atoms, COOZ, halogen atom, phenyl group, or derivative of phenyl group, $R_7$ is a hydrogen atom, alkyl group having 1 to 15 carbon atoms, halogen atom, phenyl group, or derivative of phenyl group, and Z is a hydrogen atom, ammonium radical, or alkali metal atom, or by the general formula [III]

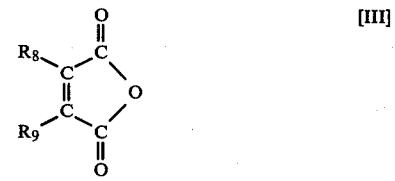

wherein $R_8$ and $R_9$ are each a hydrogen atom, alkyl group having 1 to 15 carbon atoms, halogen atom, phenyl group, or derivative of phenyl group.

6 Claims, No Drawings

NOVEL POLYMER COMPOSITION

This invention relates to a novel polymer composition in which an inorganic substance and an organic polymer are firmly consolidated.

For the polymerization of a vinyl monomer, there have been known various methods such as radical polymerization, ionic polymerization, and coordination polymerization. However, polymerization methods simple and easy to operate on commercial scale are rather few, because, for instance, these methods require some polymerization initiator such as peroxides, persulfates or azo compounds in radical polymerization; the anionic polymerization requires moisture control. Also, there have been reported noncatalytic polymerization methods without employing initiator in Makromol. Chem. (CME), 180 (11), 2649 (1979), Eur. Polymer J. (GBR), 15 (2), 153 (1979), and J. Appl. Polym. Sci, (USA), 25 (1), 89 (1980), but these methods are not practicable on commercial scale production.

Under the above-mentioned circumstances, the present inventors conducted extensive studies and, as a result, accomplished this invention which is predicated upon the discovery that when a vinyl monomer susceptible to radical polymerization is contacted with an inorganic substance, used as a third component, in the presence of a specific sulfonic acid monomer, sulfonate monomer, or carboxylic acid monomer, the polymerization activity of the vinyl monomer is markedly increased and there is formed a novel polymer composition in which the inorganic substance and the organic polymer are firmly consolidated to a degree as high as never been reached by the conventional method.

Heretofore, a great deal of efforts have been directed to the development of composite materials in which two or more component materials are combined in such a manner that the characteristics of the component materials are mutually compensated or enhanced to create a new useful function. Regarding the composite formation between an organic polymer and an inorganic powder useful as a filler for the former, improvements in a wide range of performance characteristics such as modulus of elasticity, heat distortion temperature, electric properties, and the like were reported in Plastics Eng. 30, [9], 30 (1974) and Tech. Conf. Soc. Plast. Eng. (USA), 37th, 492. However, since in the case of the above-mentioned reports the components are of quite different properties to each other, they lack interfacial affinity such as compatibility, adhesiveness, or the like and the assembly has a fundamental defect of exhibiting only insufficient composite effect, accompanying even a decline in some characteristics of the resin, such as toughness.

To improve the above defect, attempts have heretofore been made to increase the interfacial affinity between the organic polymer and the inorganic substance by a mechano-chemical method reported in Plaste Kautschuk (DDR), 26 (3), 134 (1979), in which the inorganic substance is ground in the presence of a reactive monomer to graft the organic polymer, or by a radiation method reported in Polymer Sci., USSR, 8, 24 (1966); SPE Tech. Pap. Annu. Tech. Conf. (Soc. Plast. Eng.), 23, 333 (1979); "Kinzoku Hyomen Gijutsu" (Metal Surface Technology), 29, 529 (1978), in which an inorganic substance is irradiated with a high-energy radiation to be grafted with an organic polymer. These methods, however, require a grinding step or installation of a radiation equipment, resulting in complication of the manufacturing process and increase of the manufacturing cost, and present difficult problems for the practicability of the process.

This invention has solved the above difficult problems. According to this invention, there is provided a polymer composition wherein an inorganic substance and an organic polymer are firmly consolidated, which is characterized by being produced by polymerizing a vinyl monomer susceptible to radical polymerization in a polymerization system containing a dispersed inorganic substance in the presence of at least one monomer selected from sulfonic acid monomers, sulfonate monomers, and carboxylic acid monomers represented by the general formula [I]

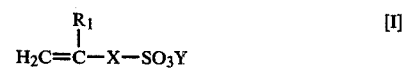

wherein $R_1$ is a hydrogen atom, alkyl group having 1 to 20 carnon atoms, phenyl group, derivative of phenyl group, or halogen atom, X is CONH,

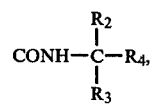

$COO(CH_2)_r$ or $(CH_2)_n$ (where $R_2$ and $R_3$ are each a hydrogen atom or alkyl group having 1 to 15 carbon atoms, $R_4$ is an alkylene group having 1 to 15 carbon atoms, m is an integer of 1 to 20, and n is an integer of 0 to 20), and Y is a hydrogen atom, ammonium radical, or an alkali metal atom, or by the general formula [II]

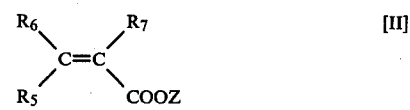

wherein $R_5$ is a hydrogen atom, alkyl group having 1 to 15 carbon atoms, COOZ, halogen atom, phenyl group, or derivative of phenyl group, $R_6$ is a hydrogen atom, alkyl group having 1 to 15 carbon atoms, COOZ, halogen atom, phenyl group, or derivative of phenyl group, $R_7$ is a hydrogen atom, alkyl group having 1 to 15 carbon atoms, halogen atom, phenyl group, or derivative of phenyl group, and Z is a hydrogen atom, ammonium radical, or alkali metal atom, or by the general formula [III]

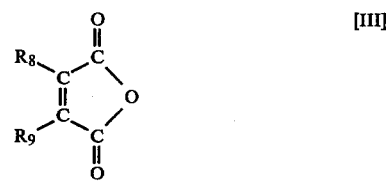

wherein $R_8$ and $R_9$ are each a hydrogen atom, alkyl group having 1 to 15 carbon atoms, halogen atom, phenyl group, or derivative of phenyl group.

When polymerization of a vinyl monomer is carried out in the presence of an acid alone under such temperature conditions that no thermal polymerization will take place, the monomer conversion is generally at a very low level even after a polymerization time extending to several days, whereas, according to this invention, the addition of an inorganic substance, as the third component, brings about very specific polymerization activity and there is formed in several hours a practically valuable polymer with a high conversion, which is very clean, being free from the deposit of cullets formed by the gas phase polymerization.

Another feature of this invention is that the interaction between the surface of an inorganic substance and the polymer formed according to this invention is a firmly consolidated union beyond the adhesion in the sense of simple adsorption. It is a further feature that the polymer which is formed is a high-molecular one. As is reported in Modern Plastics, Jan., 143 (1968), in the composite formation between an inorganic substance and a material with a greatly different modulus of elasticity such as, for example, an ordinary thermoplastic resin, a highly reinforced polymer composition is formed when there is present at the interface of both materials a high-molecular polymer which is of the same type as said resin and has a modulus of elasticity intermediate between both materials to secure smooth stress transfer. An example of the embodiment of this invention is described below.

Under the conditions such that no thermal polymerization will take place, a sulfonic acid monomer, sulfonate monomer, or carboxylic acid-type monomer is added with stirring to a suspension of an organic vinyl monomer and an inorganic substance in an aqueous medium to cause the polymerization in an aqueous heterogeneous system. In this manner it is possible to cover the surface of the inorganic substance uniformly and solidly with the polymer of said vinyl monomer in a predetermined time with a high conversion of monomer. Although it is indispensable to allow the above three components to contact with each other, yet it is not necessary to add the three components at the same time. For instance, when an inorganic substance pretreated with a sulfonic acid monomer, sulfonate monomer or carboxylic acid-type monomer is used, a similar polymer composition is obtained without adding fresh monomer during the polymerization of a vinyl monomer.

It is known that a polymer composition similar to that described above is obtained in the presence of a hydrogensulfite ion [Chemistry and Industry, 3 Aug., 619 (1974); Die Angewandte Makromoleculare Chemie, 53, 65 (1976); Japanese Patent Publication Nos. 46,552/76, 48,174/76, 13,499/77, 28,147/77, 28,148/77, 29,789/77, 31,912/77, 8,349/78 and 9,420/80]. Such a process, however, has inevitable disadvantages for its commercialization in that the resulting polymer is covered with a great deal of cullets formed by the gas phase polymerization and, moreover, is in the form of fine granules which are difficult to wash or recover. To the contrary, in the present process, by the use of a specific sulfonic acid monomer, sulfonate monomer, or carboxylic acid-type monomer, there are established the polymerization conditions for the formation of a clean polymer substantially without formation of cullets; it is also a surprising fact that because of its strong tendency to form secondary agglomerates, the resulting polymer composition is easily treated in the subsequent steps of the operation such as washing and recovering. Although a specific carboxylic acid-type monomer exhibits an industrially favorable ability to produce a polymer composition, having a desirable tendency to form secondary agglomerates substantially without deposition of cullets, yet a sulfonic acid monomer or sulfonate monomer is preferred because of a higher degree of monodispersion in the particle size of resulting polymer composition.

The specific sulfonic acid monomer, sulfonate monomer, or carboxylic acid monomer used in this invention are those which have a sulfonic acid group or a carboxylic acid group as the active site to bring about the polymerization activity and, in addition, a double bond as the active site to develop firm consolidation between the inorganic substance and the polymer which is formed. All compounds having a structure which involves those functional groups are suitable. Examples of suitable sulfonic acid monomers or sulfonate monomers include 2-acrylamido-2-methylpropanesulfonic acid (AMPS), sodium 2-methacryloylethanesulfonate (SEM.Na), sodium 3-methacryloylpropanesulfonate (SPS), sodium 2-propenesulfonate (NaAS), and sodium 2-methyl-2-propenesulfonate (NaMS). Of these, especially preferred are AMPS containing an amide linkage, and SEM.Na and SPS both containing an ester group because of their distinctive ability to form secondary agglomerates and superior polymerization activity. Examples of suitable carboxylic acid-type monomers include acrylic acid, methacrylic acid, crotonic acid, tiglic acid, cinnamic acid, maleic anhydride, and citraconic anhydride. Of these, acrylic acid, methacrylic acid and crotonic acid are especially preferred because of their desirable ability to form secondary agglomerates and of their high polymerization activity.

The inorganic substances used in this invention are elements of Groups I, II, III, IV, V and Transition Group of the periodic table and their oxides, hydroxides, chlorides, sulfates, sulfites, carbonates, phosphates, silicates, mixtures thereof, and double salts thereof. Among the inorganic substances, particularly preferred are calcium sulfite, calcium sulfate, silicon dioxide, titanium oxide, antimony trioxide, talc, clay, aluminum oxide, calcium carbonate, carbon black, graphite, carbon fiber, glass fiber, nickel powder, iron powder, zinc powder, copper powder, ferric oxide, zinc oxide, aluminum hydroxide, magnesium oxide, and calcium hydroxide, because of their outstanding ability to activate the vinyl monomer and to form a firm union with the polymer.

The vinyl monomers suitable for use in this invention include all of the vinyl monomers susceptible to radical polymerization. Above all, methyl methacrylathas a specifically high polymerization activity and, in addition, is desirable for the consolidation with inorganic substances. When a mixture of two or more monomers is used, it is preferable particularly for the polymerization activity to use methyl methacrylate as one of the component monomers.

According to this invention, the concentration of a sulfonic acid monomer, sulfonate monomer, or carboxylic acid-type monomer is about 0.05 to 100%, preferably 0.1 to 50%, most preferably 0.5 to 30% by weight based on the sum of inorganic substance and monomer. In most of the cases, with the increase in the quantity of the component monomer, it is preferable to increase the amount of a sulfonic acid monomer, sulfonate monomer, or carboxylic acid-type monomer. As compared with the case of an inorganic substance used as catalyst, the weight ratio of a monomer or a monomer mixture to the inorganic substance is far smaller and, as far as such condition is maintained, can be varied within a wide range of from about 500:1 to 1:5, usually from 250:1 to 1:5, preferably from about 50:1 to 1:1. The amount of water is 1% to several hundred-fold, preferably from 10% to ten-fold based on total weight of inorganic substance and monomer.

The polymerization is carried out under an atmosphere of inert gases such as nitrogen and at a temperature of from 10° to 100° C., preferably 20° to 80° C. Although the most suitable polymerization temperature for particular cases is suitably selected depending upon the type of vinyl monomer, it is important to conduct the polymerization at a temperature at which the thermal polymerization takes place merely to a negligible extent. If the polymerization is carried out at a temperature at which an appreciable degree of thermal polymerization will take place, the integrity and the uniformity of the resulting composite will be hindered. The reaction time is from 30 minutes to about 15 hours. The resulting composite can be dried at a temperature in the range of about 10° to 300° C., preferably from about 50° to 200° C.

Further, the interaction between the inorganic substance and the polymer formed according to this invention is very strong exceeding the adhesion in physical sense such as that resulting from adsorption or by van der Waals' force, as evidenced by the large amount of unextractable polymer remaining after extraction with a good solvent for the polymer.

The present composition is useful as a reinforcing filler for organic polymers and as a thickening agent or a dispersant for coating compositions.

The invention is further illustrated below in detail with reference to Examples.

EXAMPLE 1 AND COMPARATIVE EXAMPLES 1 TO 6

In a 500-ml four-necked flask provided with a cooler, nitrogen inlet, stirrer and a thermocouple for detecting the internal temperature, 38.7 g of calcium sulfite hemihydrate, used as the inorganic substance, was suspended in 270 ml of deionized water to form a dispersion. After flushing the flask with nitrogen for 30 minutes, 30.0 g of MMA, used as the vinyl monomer, was added to the dispersion with vigorous stirring under a nitrogen stream. The reactant mixture was heated to 50° C. in a water bath. After confirming the uniform dispersion of the added monomer, to the dispersion was added slowly a solution of 6.5 g of SEM.Na, used as the sulfonate monomer, dissolved in 10 ml of deionized water. The mixture was maintained at the same temperature to allow the polymerization to proceed for 8 hours. After completion of the polymerization, about 2 g of the reaction mixture was withdrawn as a sample. The sample was tested for the conversion by determining the remained unreacted monomer by gas chromatography using dioxane as internal standard.

For comparison, similar polymerization procedure and similar evaluation tests on the polymerization mixture to those described above were repeated in the cases where the addition of the inorganic substance, sulfonic acid monomer, or sulfonate monomer was omitted and in the cases where ethanesulfonic acid, which is a saturated sulfonic acid, or an aqueous sulfurous acid solution was added.

The results obtained were as shown in Table 1, wherein all parts are by weight.

TABLE 1

| | Compound containing sulfonic group (parts) | | | | | Inorganic substance (parts) Calcium sulfite*2 | Vinyl monomer (parts) MMA*3 | Deionized water (parts) | Nature of polymerizate*4 | | Conversion of monomer (%) |
|---|---|---|---|---|---|---|---|---|---|---|---|
| | SEM.Na | SPS | AMPS | Ethane- sulfonic acid | Aqueous sulfurous acid* | | | | Cullet deposition | Secondary agglomeration | |
| Example 1 | 6.5 | — | — | — | — | 38.7 | 30.0 | 280 | | | 82.6 |
| Comparative Example 1 | 6.5 | — | — | — | — | — | 30.0 | 280 | — | — | 7.0 |
| Comparative Example 2 | — | 7.0 | — | — | — | — | 30.0 | 280 | — | — | 7.3 |
| Comparative Example 3 | — | — | 6.6 | — | — | — | 30.0 | 280 | — | — | 7.6 |
| Comparative Example 4 | — | — | — | — | — | 38.7 | 30.0 | 280 | — | — | 0.0 |
| Comparative Example 5 | — | — | — | 6.6 | — | 38.7 | 30.0 | 280 | x | xx | 11.6 |
| Comparative Example 6 | — | — | — | — | 41 | 38.7 | 30.0 | 280 | xx | xx | 79.8 |

Note:
*¹6% aqueous sulfurous acid solution
*²First grade reagent; product of Wako Junyaku Co.
*³MMA: methyl methacrylate
*⁴Cullet deposition:
  Substantially none;
  x considerable deposition;
  xx plenty of deposition.
Secondary agglomeration:
  Good, washing and recovery very easy;
  xx poor, washing and recovery very difficult.

As is apparent from Table 1, no polymerization activity was observed when neither sulfonic acid monomer nor sulfonate monomer was added as in Comparative Example 4, and a very low polymerization activity was observed in a two-component system comprising a vinyl monomer and a sulfonic acid monomer or a sulfonate monomer, whereas the monomer conversion became very high by the addition of an inorganic substance as the third component according to this invention. On the other hand, although a high monomer conversion was observed, a conventional polymerization system containing aqueous sulfurous acid, as shown in Comparative Example 6, gave a polymerizate markedly inferior in the problem of cullet deposition and in the ability to form secondary agglomerates as compared with the present method, indicating that the practicability of the latter is promising.

EXAMPLES 2 TO 5

The polymerization was carried out in the same manner as in Example 1, except that SPS, AMPS, NaAS or NaMS was used as the sulfonic acid monomer or sulfonate monomer in place of SEM.Na. In Table 2, are shown the evaluation results of the monomer conversion in comparison with those of Example 1.

TABLE 2

|  | Acid monomer | | Inorganic substance | Vinyl monomer | Deionized | Monomer |
|---|---|---|---|---|---|---|
|  | Type | Amount (parts) | Calcium sulfite (parts) | MMA (parts) | water (parts) | conversion (%) |
| Example 1 | SEM.Na | 6.5 | 38.7 | 30.0 | 280 | 82.6 |
| Example 2 | SPS | 7.0 | " | " | " | 80.3 |
| Example 3 | AMPS | 6.6 | " | " | " | 72.7 |
| Example 4 | NaAS | 4.3 | " | " | " | 44.5 |
| Example 5 | NaMS | 4.7 | " | " | " | 41.1 |

As is apparent from Table 2, the polymerization activity was very high with SEM.Na, SPS and AMPS, while somewhat lower with NaAS and NaMS.

About 10 g of each polymer composition obtained in Examples 1 to 5 was placed in a cylindrical paper filter and accurately weighed. Using benzene, which is a good solvent for the methyl methacrylate polymer, as extraction solvent, the sample was extracted in a Soxhlet extractor for 24 hours and the percentage extraction of said polymer composition as well as $[\eta]$ of the polymer in the extract were determined. For comparison, an inorganic substance (calcium sulfite) was dispersed in a solution of polymethyl methacrylate in methylene chloride by milling and the solvent was removed by evaporation to obtain a composition in which the inorganic substance was covered with polymethyl methacrylate (Comparative Example 7). This composition and the compositions (Comparative Examples 8 and 9) obtained by use of common radical polymerization catalysts were tested in a manner similar to that described above. The results obtained were as shown in Table 3. The polymer components of the compositions obtained in Comparative Examples were completely extracted in 24 hours of extraction, whereas the polymer components of the composite compositions obtained according to this invention showed only a small percentage extraction, most part of the polymer component being resistant to extraction and firmly consolidated with calcium sulfite. It is also seen that the polymer components in the compositions of this invention have far higher $[\eta]$ values than those of polymers obtained by the common procedures.

TABLE 3

|  | Polymerization procedure*[1] | Monomer conversion (%) | Nature of polymerizate | Percentage extraction; benzene, 24 hours (%) | $[\eta]$*[2] polymer in extract |
|---|---|---|---|---|---|
| Example 1 | Present invention, SEN.Na | 82.6 | Uniform consolidation of inorg. subst. with polymer | 15 | 0.485 |
| Example 2 | Present invention, SPS | 80.3 | Uniform consolidation of inorg. subst. with polymer | 15 | 0.569 |
| Example 3 | Present invention, AMPS | 72.7 | Uniform consolidation of inorg. subst. with polymer | 13 | 0.686 |
| Example 4 | Present invention, NaAS | 44.5 | Uniform consolidation of inorg. subst. with polymer | 25 | 0.412 |
| Example 5 | Present invention, NaMS | 41.1 | Uniform consolidation of inorg. subst. with polymer | 28 | 0.408 |
| Comparative Example 7 | Mixing in polymethyl methacrylate solution*[3] | — | — | 100 | 0.056 |
| Comparative Example 8 | Polymerization in aqueous medium with AIBN as initiator | 43.0 | Independent presence of inorg. subst. and homopolymer | 100 | 0.059 |
| Comparative Example 9 | Polymerization in aqueous medium with KPS as initiator | 5.0 | Independent presence of inorg. subst. and homopolymer | 100 | 0.053 |

Note:
*[1]The inorganic substance used was calcium sulfite.
*[2]As determined at 25° C. in chloroform (0.5% solution).
*[3]Acrypet VH (a product of Mitsubishi Rayon Co.) was used.
AIBN Azobisisobutyronitrile
KPS Potassium persulfate

EXAMPLE 6

Polymerization was carried out in the same manner as in Example 1, except that various inorganic substances other than the calcium sulfite were used. The results of evaluation of the compositions obtained were as shown in Table 4.

mer, under a stream of nitrogen. The reactant mixture was heated to 50° C. in a water bath and allowed to polymerize at the same temperature for 8 hours. After

TABLE 4

| | Inorganic substance | | Acid monomer | Vinyl monomer | De-ionized | Monomer con- | Nature of polymerizate | |
|---|---|---|---|---|---|---|---|---|
| | | | | | | | Deposition | 2 ry agglo- |
| No. | Type | Amount (parts) | SEM.Na (parts) | MMA (parts) | water (parts) | version (%) | of cullet | mera- tion |
| 1 | Calcium sulfate | 38.7 | 6.5 | 30.0 | 280 | 78.0 | | |
| 2 | Silicon dioxide | " | " | " | " | 76.2 | | |
| 3 | Titanium oxide | " | " | " | " | 71.5 | | |
| 4 | Talc | " | " | " | " | 80.8 | | |
| 5 | Antimony trioxide | " | " | " | " | 79.3 | | |
| 6 | Clay | " | " | " | " | 76.6 | | |
| 7 | Calcium carbonate | " | " | " | " | 75.1 | | |
| 8 | Aluminum oxide | " | " | " | " | 70.1 | | |
| 9 | Carbon black | " | " | " | " | 65.3 | | |
| 10 | Nickel powder | " | " | " | " | 83.0 | | |
| 11 | Iron powder | " | " | " | " | 81.1 | | |
| 12 | Zinc powder | " | " | " | " | 71.0 | | |
| 13 | Copper powder | " | " | " | " | 80.0 | | |
| 14 | Ferric oxide | " | " | " | " | 66.2 | | |
| 15 | Zinc oxide | " | " | " | " | 61.9 | | |
| 16 | Aluminum hydroxide | " | " | " | " | 42.0 | | x |
| 17 | Magnesium oxide | " | " | " | " | 33.2 | | x |
| 18 | Calcium hydroxide | " | " | " | " | 30.1 | | x |
| 19 | Graphite | " | " | " | " | 70.1 | | |
| 20 | Carbon fiber (powder) | " | " | " | " | 85.0 | | |
| 21 | Glass fiber (powder) | " | " | " | " | 67.3 | | |

As is apparent from Table 4, although the present process showed some degree of dependence upon the type of inorganic substance, the monomer conversion was generally good. The process was found to be satisfactory with respect to the deposition of cullet and the secondary agglomeration, both of which are important problems for the practicability of the present process.

EXAMPLE 7

Polymerization was carried out in the same manner as in Example 1, except that vinyl monomers shown in Table 5 were used each along or in mixtures in place of the methyl methacrylate. The results of evaluation performed on the resulting compositions were as shown in Table 5.

completion of the polymerization, a sample was withdrawn and evaluated as in Example 1. It was found that the monomer conversion was 72.1%, and the resulting polymer composition has a structure such that the surface of the inorganic substance was uniformly and firmly covered with the consolidated polymer of said monomer.

EXAMPLE 9 AND COMPARATIVE EXAMPLES 10 TO 13

In a 500-ml four-necked flask provided with a condenser, nitrogen inlet, stirrer and a thermocouple four detecting the internal temperature, 38.7 g of calcium sulfite hemihydrate, used as the inorganic substance, was suspended in 280 ml of deionized water to form a

TABLE 5

| | Vinyl monomer | | Compound containing sulfonic acid group | Inorganic substance Calcium | Deionized | Monomer |
|---|---|---|---|---|---|---|
| No. | Type | Amount (parts) | SEM.Na (parts) | sulfite (parts) | water (parts) | conversion (%) |
| 1 | ST | 30.0 | 6.5 | 38.7 | 280 | 20.0 |
| 2 | BuA | " | " | " | " | 27.8 |
| 3 | MMA/ST*1 | " | " | " | " | 71.5 |
| 4 | MMA/BuA | " | " | " | " | 62.3 |
| 5 | ST/BuA | " | " | " | " | 22.5 |

Note:
*1Mixing ratio of monomers: 50:50 by weight;
ST: styrene;
BuA: n-butyl acrylate;
MMA: methyl methacrylate

EXAMPLE 8

Into a Henschel mixer for milling powders, were charged 38.7 g of calcium sulfite and 6.5 g of SEM.Na. The mixture was thoroughly stirred for 10 minutes and suspended in 280 ml of deionized water to form a dispersion in a reactor provided with auxiliaries as in Example 1. To the resulting filler mixture, after flushing with nitrogen for 30 minutes, was added with vigorous stirring 30.0 g of methyl methacrylate, used as vinyl monodispersion. After flushing the flask with nitrogen for 30 minutes, 30.0 g of methyl methacrylate, used as the vinyl monomer, was added to the dispersion with vigorous stirring under a nitrogen stream. The reactant mixture was heated to 50° C. in a water bath. After confirming the uniform dispersion of the added monomer, to the dispersion was added slowly 2.0 g of commercially available special grade acrylic acid, used as the carboxylic acid-type monomer. The mixture was maintained at the same temperature to allow the polymerization to proceed for 8 hours. After completion of the polymerization, about 2 g of the reaction mixture was withdrawn as a sample. The sample was tested for the conversion by determining the remained unreacted monomer by gas chromatography using dioxane as internal standard. For comparison, similar polymerization procedure and similar evaluation tests on the polymerization mixture to those described above were repeated without adding the inorganic substance or the carboxylic acid-type monomer.

The results obtained were as shown in Table 6, wherein all parts are by weight.

TABLE 6

| | Carboxylic acid-type monomer | | | Inorganic substance | Vinyl | | Monomer |
|---|---|---|---|---|---|---|---|
| | Acrylic acid (parts) | Methacrylic acid (parts) | Crotonic acid*1 (parts) | Calcium sulfite*2 (parts) | monomer MMA (parts) | Deionized water (parts) | conversion (%) |
| Example 9 | 2.0 | — | — | 38.7 | 30.0 | 280 | 81.1 |
| Comparative Example 10 | 2.0 | — | — | — | 30.0 | 280 | 7.2 |
| Comparative Example 11 | — | 2.6 | — | — | 30.0 | 280 | 7.6 |
| Comparative Example 12 | — | — | 2.6 | — | 30.0 | 280 | 7.0 |
| Comparative Example 13 | — | — | — | 38.7 | 30.0 | 280 | 0.0 |

Note:
*1 $CH_3CH=CHCO_2H$
*2 First grade reagent (Wako Junyaku Co.)
MMA Methyl methacrylate As is apparent from Table 6, no polymerization activity was observed when the carboxylic acid-type monomer was not added as in Comparative Example 13 and a low activity was observed in a two-component system comprising a vinyl monomer and a carboxylic acid-type monomer, whereas the monomer conversion became very high by the addition of an inorganic substance as the third component according to this invention, indicating promising practicability of this invention.

EXAMPLES 10 TO 14 AND COMPARATIVE EXAMPLES 14 TO 16

Polymerization was carried out in the same manner as in Example 9, except that methacrylic acid, crotonic acid, tiglic acid, cinnamic acid, or maleic anhydride was used as the carboxylic acid-type monomer in place of the acrylic acid. The results of determination of monomer conversions and evaluation of the polymer compositions were as shown in Table 7.

activities, while tiglic acid, cinnamic acid and maleic anhydride showed polymerization activities at somewhat lower levels; similar tendencies were observed in the cullet deposition and secondary agglomeration, both of which are important factors for the commercialization of the process.

About 10 g of each polymer composition obtained in Examples 9 to 14 was placed in a cylindrical paper filter and accurately weighed. using benzene, which is a good solvent for the polymethyl methacrylate, as extraction solvent, the sample was extracted in a Soxhlet extractor for 24 hours and the percentage extraction of said polymer composition and [$\eta$] of the polymer in the extract were determined. For comparison, a powdered inorganic substance (calcium sulfite) was dispersed in a solution of polymethyl methacrylate in methylene chloride by milling and the solvent was removed by evaporation to obtain a composition in which the inorganic substance was covered with polymethyl methacrylate (Comparative Example 14). This composition and the compositions (Comparative Examples 15 and 16) obtained by common radical polymerization were tested in a manner similar to that described above. The results obtained were as shown in Table 8. The polymer components of the compositions obtained in Comparative Examples were completely extracted in 24 hours of extraction, whereas the polymer components of the composite compositions obtained according to this invention showed only a small percentage extraction, most part of the polymer component being resistant to extraction and firmly consolidated with calcium sulfite. It is also seen that the polymer components in the compositions of this invention have far higher [$\eta$] values

TABLE 7

| Example No. | Carboxylic acid-type monomer | | Inorganic substance Calcium sulfite (parts) | Vinyl monmer MMA (parts) | DE-ionized water (parts) | Monomer conversion (%) | Nature of polymerizate | |
|---|---|---|---|---|---|---|---|---|
| | Type | Amount (parts) | | | | | Cullet deposition | 2 ry agglomeration |
| 9 | Acrylic acid | 2.0 | 38.7 | 30.0 | 280 | 81.1 | | |
| 10 | Methacrylic acid | 2.6 | " | " | " | 88.5 | | |
| 11 | Crotonic acid | 2.6 | " | " | " | 80.0 | | |
| 12 | Tiglic acid*1 | 3.0 | " | " | " | 62.3 | | Δ |
| 13 | Cinnamic acid*2 | 4.4 | " | " | " | 57.6 | | Δ |
| 14 | Maleic anhydride | 2.9 | " | " | " | 61.0 | | Δ |

Note:
*1 $CH_3CH=C(CH_3)CO_2H$
*2 $C_6H_5CH=CHCO_2H$

As is apparent from Table 7, acrylic acid, methacrylic acid and crotonic acid showed high polymerization than those of polymers obtained by the common polymerization procedures.

TABLE 8

| | Polymerization procedure[*1] | Monomer conversion (%) | Nature of polymerizate | Percentage extraction, benzene, 24 hours (%) | $[\eta]$[*2] of polymer in extract |
|---|---|---|---|---|---|
| Example 9 | Present invention, acrylic acid | 81.1 | Uniform consolidation of inorg. subst. with polymer | 12 | 0.491 |
| Example 10 | Present invention, methacrylic acid | 88.5 | Uniform consolidation of inorg. subst. with polymer | 12 | 0.477 |
| Example 11 | Present invention, crotonic acid | 80.0 | Uniform consolidation of inorg. subst. with polymer | 14 | 0.523 |
| Example 12 | Present invention, tiglic acid | 62.3 | Uniform consolidation of inorg. subst. with polymer | 19 | 0.405 |
| Example 13 | Present invention, cinnamic acid | 57.6 | Uniform consolidation of inorg. subst. with polymer | 21 | 0.410 |
| Example 14 | Present invention, maleic anhydride | 61.0 | Uniform consolidation of inorg. subst. with polymer | 20 | 0.415 |
| Comparative Example 14 | Mixing in polymethyl methacrylate solution[*3] | — | — | 100 | 0.056 |
| Comparative Example 15 | Polymerization in aqueous medium with AIBN as initiator | 43.0 | Independent presence of inorg. subst. and homopolymer | 100 | 0.059 |
| Comparative Example 16 | Polymerization in aqueous mesium with KPS as initiator | 5.0 | Independent presence of inorg. subst. and homopolymer | 100 | 0.053 |

Note:
[*1]The inorganic substance used was calcium sulfite.
[*2]As determined at 25° C. in chloroform (0.5% solution).
[*3]Acrypet VH (a product of Mitsubishi Rayon Co.) was used.
AIBN Azobisisobutyronitrile
KPS Potassium persulfate

EXAMPLE 15

Polymerization and evaluation of the resulting compositions were carried out in the same manner as in Example 9, except that various inorganic substances were used in place of the calcium sulfite. The results obtained were as shown in Table 9.

TABLE 9

| | Inorganic substance | | Acid monomer Acrylic acid (parts) | Vinyl monomer MMA (parts) | Deionized water (parts) | Monomer conversion (%) | Nature of polymerizate Deposition of cullet | 2 ry agglomeration |
|---|---|---|---|---|---|---|---|---|
| No. | Type | Amount (parts) | | | | | | |
| 1 | Calcium sulfate | 38.7 | 2.0 | 30.0 | 280 | 79.1 | | |
| 2 | Silicon dioxide | " | " | " | " | 80.0 | | |
| 3 | Titanium oxide | " | " | " | " | 78.9 | | |
| 4 | Talc | " | " | " | " | 83.5 | | |
| 5 | Antimony trioxide | " | " | " | " | 76.2 | | |
| 6 | Clay | " | " | " | " | 81.3 | | |
| 7 | Calcium carbonate | " | " | " | " | 80.5 | | x |
| 8 | Aluminum oxide | " | " | " | " | 72.7 | | |
| 9 | Carbon black | " | " | " | " | 68.0 | | |
| 10 | Nickel powder | " | " | " | " | 81.0 | | |
| 11 | Iron powder | " | " | " | " | 80.3 | | |
| 12 | Zinc powder | " | " | " | " | 78.8 | | |
| 13 | Copper powder | " | " | " | " | 71.4 | | |
| 14 | Ferric oxide | " | " | " | " | 83.0 | | |
| 15 | Zinc oxide | " | " | " | " | 70.0 | | |
| 16 | Aluminum hydroxide | " | " | " | " | 71.9 | Δ | Δ |
| 17 | Magnesium oxide | " | " | " | " | 58.1 | Δ | x |
| 18 | Calcium hydroxide | " | " | " | " | 43.6 | Δ | Δ |
| 19 | Graphite | " | " | " | " | 71.1 | | |
| 20 | Carbon fiber (powder) | " | " | " | " | 80.0 | | |

TABLE 9-continued

| No. | Inorganic substance Type | Amount (parts) | Acid monomer Acrylic acid (parts) | Vinyl monomer MMA (parts) | De-ionized water (parts) | Monomer conversion (%) | Nature of polymerizate Deposition of cullet | 2 ry agglomeration |
|---|---|---|---|---|---|---|---|---|
| 21 | Glass fiber (powder) | " | " | " | " | 62.1 | | |

As is apparent from Table 9, although with respect to the polymerization activity the present process showed some degree of dependence upon the type of inorganic substance, the monomer conversion was generally good. The process was found to be satisfactory with respect to the deposition of cullet and the secondary agglomeration, both of which are important factors for the practicability of the present process.

EXAMPLE 16

Polymerization was carried out in the same manner as in Example 9, except that vinyl monomers shown in Table 10 were used each alone or in mixtures in place of the methyl methacrylate. The results of evaluation performed on the resulting composition were as shown in Table 10.

TABLE 10

| No. | Vinyl monomer Type | Amount (parts) | Acid monomer Acrylic acid (parts) | Inorganic substance Calcium sulfite (parts) | De-ionized water (parts) | Monomer conversion (%) |
|---|---|---|---|---|---|---|
| 1 | ST | 30.0 | 2.0 | 38.7 | 280 | 26.7 |
| 2 | BuA | " | " | " | " | 33.9 |
| 3 | MMA/ST*[1] | " | " | " | " | 79.1 |
| 4 | MMA/BuA | " | " | " | " | 70.0 |
| 5 | ST/BuA | " | " | " | " | 28.1 |

Note:
*[1]Mixing ratio of monomers: 50:50 by weight.
ST: styrene;
BuA: n-butyl acrylate;
MMA: methyl methacrylate.

EXAMPLE 17

Into a Henschel mixer for milling powders, were charged 38.7 g of calcium sulfite and 2.0 g of acrylic acid. The mixture was thoroughly stirred for 10 minutes and suspended in 280 ml of deionized water to form a dispersion in a reactor provided with auxiliaries as in Example 1. To the resulting filler mixture, after flushing with nitrogen for 30 minutes, was added with vigorous stirring 30.0 g of methyl mechacrylate, used as vinyl monomer, under a stream of nitrogen. The reactant mixture was heated to 50° C. in a water bath and allowed to polymerize at the same temperature for 8 hours. After completion of the polymerization, a sample was found that the monomer conversion was 76.8%, and the resulting polymer composition has a structure such that the surface of the inorganic substance was uniformly and firmly covered with the consolidated polymer of said vinyl monomer.

EXAMPLE 18

The polymer compositions according to this invention were blended with pellets of general purpose polymers and the inorganic substance content was adjusted to 30%. A molded article of the composite composition was prepared from each blend by means of an extruder and evaluated for the processability, dispersibility, gloss and mechanical characteristics. For comparison, a blend of the polymer and the untreated inorganic substance (referred to as simple blend in Table 11) and a blend of the polymer composition obtained by using an aqueous sulfurous acid as initiator (referred to as $H_2SO_3$ initiated in Table 11) were prepared and tested likewise. The results were as shown in Table 11.

TABLE 11

| | Composite composition | | Processability and appearance | | | Mechanical characteristics | |
|---|---|---|---|---|---|---|---|
| | Inorganic substance | Polymer being blended | Processability | Dispersibility | Gloss | Tensile strength (kg/cm$^2$) | Izod impact resistance (kg · cm/cm$^2$) |
| SEM.Na—initiated | CaSO$_3$.½H$_2$O | Acrypet VH | | | | 563 | 8.9 |
| Acrylic acid-initiated | " | " | | | | 501 | 7.0 |
| Simple blend | " | " | x | # | x | 398 | 3.9 |
| H$_2$SO$_3$—initiated | " | " | x | # | x | 401 | 4.0 |
| SEM.Na—initiated | Talc | Nylon 6* | | | | 803 | 23.2 |
| Acrylic acid-initiated | " | " | | | | 750 | 20.0 |
| Simple blend | " | " | x | Δ | x | 673 | 16.1 |

TABLE 11-continued

| | Composite composition | | Processability and appearance | | | Mechanical characteristics | |
|---|---|---|---|---|---|---|---|
| | Inorganic substance | Polymer being blended | Process- ability | Disper- sibili- ty | Gloss | Tensile strength (kg/cm$^2$) | Izod impact resistance (kg · cm/cm$^2$) |
| H$_2$SO$_3$—initiated | " | " | x | # | x | 691 | 12.5 |

Note:
(1) *T-803, a product of Toyobo Co.
(2) Evaluation for the processability and the appearance was performed as follows:
Processability:
 No emission of particulates; grabbed by the extruder screw while maintaining the condition of uniform blend with polymer pellets.
  Moderate emission of particulates; grabbed by the extruder screw while maintaining the condition of uniform blend with polymer pellets.
x Emission of plenty of particulates; grabbed by the extruder screw in the form of non-uniform mixture of the polymer pellets and the inorganic substance.
Dispersibility:
 No fish-eye in the extruded strand.
  Scarcely any fish-eye in the extruded strand.
Δ Moderate number of fish-eyes in the extruded strand.
A great number of fish-eyes in the extruded strand.
Gloss:
 Specular gloss (JIS Z 8741) >Gs(60°) 31
  Specular gloss (JIS Z 8741) Gs(60°) 16-30
x Specular gloss (JIS Z 8741) <Gs(60°) 15

As is apparent from Table 11, the polymer composition of this invention is excellent in practically important performance characteristics such as processability and appearance and mechanical properties of shaped articles.

What is claimed is:

1. A method of preparing a polymeric composition in which an inorganic substance is firmly consolidiated in an organic polymer, comprising: heterogeneously polymerizing methylmethacrylate or a vinyl monomer mixture comprising methylmethacrylate as the major component without initiating the reaction with a radical polymerization initiator at a temperature such that substantially no thermal polymerization occurs in a polymerization system containing said inorganic substance dispersed in an aqueous medium in the presence of at least one monomer selected from the group consisting of sulfonic acid monomers and sulfonate monomers of formula [I]

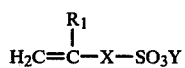

wherein R$_1$ is hydrogen, alkyl of 1 to 20 carbon atoms, phenyl, a derivative of a phenyl group, or a halogen atom; X is CONH,

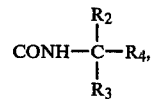

COO(CH$_2$)$_m$ or (CH$_2$)$_n$
wherein R$_2$ and R$_3$ are each hydrogen or alkyl of 1 to 15 carbon atoms, R$_4$ is an alkylene group of 1 to 15 carbon atoms, m is an integer of 1 to 20, and n is 0 or an integer of 1 to 20; and U is a hydrogen atom, ammonium radical or an alkali metal atom.

2. The method of claim 1, wherein the sulfonic acid monomer or sulfonate monomer is 2-acrylamido-2-methylpropanesulfonic acid, sodium 2-methacryloylethanesulfonate, or sodium 3-methacryloylpropanesulfonate.

3. The method of claim 1, wherein the inorganic substance is at least one member selected from the group consisting of calcium sulfite, calcium sulfate, silicon dioxide, titanium oxide, antimony trioxide, talc, clay, aluminum oxide, calcium carbonate, carbon black, carbon fiber, glass fiber, graphite, nickel powder, iron powder, zinc powder, copper powder, iron oxide, zinc oxide and aluminum hydroxide.

4. The method of claim 1, wherein the weight ratio of monomer mixture to the inorganic substance ranges from 250:1 to 1:5.

5. The method of claim 1, wherein said polymerization reaction is conducted under an inert gas atmosphere at a temperature from 10° to 100° C.

6. The method of claim 1, wherein the amount of said sulfonic acid monomer or sulfonate monomer in the reaction medium ranges from 0.05 to 100% by weight based on the total amount of inorganic substance and monomer in the polymerization medium.

* * * * *